United States Patent

Mickael

Patent Number: 5,808,298
Date of Patent: Sep. 15, 1998

[54] METHOD FOR DETERMINING FORMATION HYDROCARBON SATURATION AND WELLBORE HYDROCARBON HOLDUP FROM MULTIDETECTOR CARBON-OXYGEN MEASUREMENTS

[75] Inventor: Medhat W. Mickael, Sugar Land, Tex.

[73] Assignee: Western Atlas International, Inc., Houston, Tex.

[21] Appl. No.: 798,256

[22] Filed: Feb. 11, 1997

[51] Int. Cl.$^6$ ............................................. G01V 5/10
[52] U.S. Cl. ................................. 250/269.6; 250/269.7
[58] Field of Search ............................. 250/269.7, 269.6

[56] References Cited

U.S. PATENT DOCUMENTS

| | | | |
|---|---|---|---|
| 4,937,446 | 6/1990 | McKeon et al. | 250/269.7 |
| 5,045,693 | 9/1991 | McKeon et al. | 250/269.7 |
| 5,055,676 | 10/1991 | Roscoe et al. | 250/269.7 |
| 5,374,823 | 12/1994 | Odom | 250/269.6 |
| 5,699,246 | 12/1997 | Plasek et al. | 364/422 |

*Primary Examiner*—Constantine Hannaher
*Attorney, Agent, or Firm*—Richard A. Fagin

[57] ABSTRACT

A method for determining oil saturation in an earth formation penetrated by a wellbore. Measurements of relative amounts of carbon and oxygen are made by spectral analysis of neutron-induced inelastic gamma rays detected from the earth formation at spaced apart locations. The method includes calculating an apparent oil holdup in the wellbore at each of the spaced apart locations from the relative amounts of carbon and oxygen. A corrected oil holdup is calculated in the wellbore from differences between the apparent holdups determined at each of the spaced apart locations. An apparent oil saturation in the formation is determined at each of the spaced apart locations from the relative amounts of carbon and oxygen and the corrected oil holdup. A corrected formation oil saturation is determined from differences between the apparent oil saturations at each of the spaced apart locations. In a preferred embodiment, the apparent oil holdups and apparent oil saturations are determined by comparing the measured carbon and oxygen amounts with empirical relationships of the relative amounts of carbon and oxygen with respect to known values of oil holdup and oil saturation for various mineral compositions and porosity values of the earth formation.

32 Claims, 9 Drawing Sheets

METHOD FOR DETERMINING FORMATION HYDROCARBON SATURATION AND WELLBORE HYDROCARBON HOLDUP FROM MULTIDETECTOR CARBON-OXYGEN MEASUREMENTS

BACKGROUND OF THE INVENTION

1. Field of the Invention

The invention is related to the field of electric wireline wellbore logging. More specifically, the invention is related to methods of well logging for determining the fractional amount of hydrocarbon filling the pore spaces of earth formations by analysis of neutron-induced gamma ray spectroscopy measurements.

2. Description of the Related Art

A type of induced gamma ray spectroscopy logging known as carbon-oxygen logging is used for determining the fractional volume of oil in the pore spaces of earth formations. Carbon-oxygen measuring instruments typically include a controllable source of high energy neutrons and one or more gamma ray detectors capable of generating an output corresponding to the energy level of the gamma rays which it detects. The source periodically emits short-duration "bursts" of neutrons into the earth formations. Sources known in the art typically emit neutrons having an average energy level of about 14 million electron volts (MeV). The high energy neutrons emanating from the source collide with nuclei in the earth formations. Some of the collisions, known as "inelastic" collisions, result in the high energy neutrons retaining a substantial portion of their original energy. The energy which is lost in inelastic collisions is generally released in the form of a gamma ray. The energy level of the gamma rays induced by inelastic collisions is unique to each particular nuclear isotope in the earth formations. Since the detector generates a signal corresponding to the detected gamma ray energy level, the relative abundance in the formation of certain nuclear isotopes can be determined by characterizing the energy spectrum of the inelastic gamma rays which are detected.

In carbon-oxygen logging, inelastic neutron collision with oxygen nuclei induces gamma rays having an energy level of 6.1 MeV, and to a lesser extent an energy level of 7.1 MeV. Inelastic neutron collision with carbon nuclei induces gamma rays having an energy level of 4.4 MeV. By determining the relative number of gamma rays detected at each of these energy levels, a ratio of the number of carbon nuclei with respect to the number of oxygen nuclei can be determined, this being the so-called "carbon-oxygen ratio". The carbon-oxygen ratio is significant because it can help distinguish between oil and water in the pore spaces of earth formations. Water includes substantially no carbon, but includes oxygen. Oil has very low oxygen content but typically has very high carbon content.

Carbon-oxygen logging has been difficult to perform because of, among other things, the effects of fluid within the wellbore. Fluid in the wellbore typically has a very high content of oxygen and/or carbon, depending on how much of the fluid is oil or water. The inelastic collision gamma rays emanating from the wellbore, therefore have substantially the same spectral characteristics as the gamma rays sought to be detected from the earth formation. Moreover, the inelastic gamma ray counting rate from the wellbore typically is much higher than the inelastic gamma ray rate from the earth formation because the fluid content per unit volume is much higher in the wellbore (where the instrument is immersed in the fluid) than in the earth formation. The fluid only occupies voids in the formation, called pore spaces, which typically do not amount to much more than 40 percent, and frequently substantially less than that, of the total volume of the earth formation.

A method for correcting the carbon/oxygen log for the effects of the fluid in the wellbore is described in European Patent no. EP 0 465 276 B1 issued to Roscoe et al and entitled, *Method for Determining Oil and Water Saturation in Earth Formation Surrounding a Borehole*. The method described in this patent includes measuring gamma rays at two spaced apart detectors, and determining the carbon and oxygen yields at each detector. The carbon and oxygen yields at each detector are scaled into linear functions of oil volume with respect to water volume (referred to as "holdup"). The difference between carbon and oxygen yields at each detector are used to solve the linear equations to yield the oil holdup in the wellbore and the fractional volume of the pore space which is filled with oil (the so-called "oil saturation").

A drawback to the method in European Patent no. EP 0 465 276 B1 is the use of linear scaling to describe the relationship between carbon and oxygen yields at each detector, and the oil holdup in the wellbore and oil saturation in the formation. Carbon and oxygen yields are not necessarily linearly related to oil holdup in the wellbore and to the oil saturation in the earth formation.

SUMMARY OF THE INVENTION

The invention is a method for determining the oil saturation in an earth formation penetrated by a wellbore. Measurements of the relative amounts of carbon and oxygen in the wellbore and formation are made by spectral analysis of neutron-induced inelastic gamma rays detected from the earth formation at spaced apart locations. The method includes calculating an apparent oil holdup in the wellbore at each one of the spaced apart locations from the measurements of the relative amounts of carbon and oxygen. The apparent oil holdup is determined by comparing the measured values of carbon and oxygen content to an empirical relationship of the amount of carbon and oxygen with respect to preselected known values oil holdup. The empirical relationship is determined for a range of values of porosity of the formation, for various mineral compositions of the formation, and for various values of diameter of the wellbore from within which the measurements are made. A corrected oil holdup in the wellbore is calculated from the differences between the apparent holdup values determined at each of the spaced apart locations. The corrected oil holdup is determined from an empirical relationship of differences in apparent holdup with respect to known values of oil holdup for the particular configuration of the instrument used to make the gamma ray measurements. The configuration refers to the numbers of and spacings of each of the detectors from the source.

An apparent oil saturation in the formation is determined at each of the spaced apart locations from the relative amounts of carbon and oxygen and the corrected oil holdup. The apparent oil saturation is determined by comparing the measured carbon and oxygen values with respect to an empirical relationship with respect to known values of oil saturation. A corrected oil saturation in the formation is determined from differences between the apparent saturations at each of the spaced apart locations. The corrected saturation is determined from the differences in apparent saturation by comparing the differences to an empirical relationship of differences with respect to known values of saturation for the particular configuration of the instrument used to make the measurements.

DESCRIPTION OF THE PREFERRED EMBODIMENT

Figure 1:
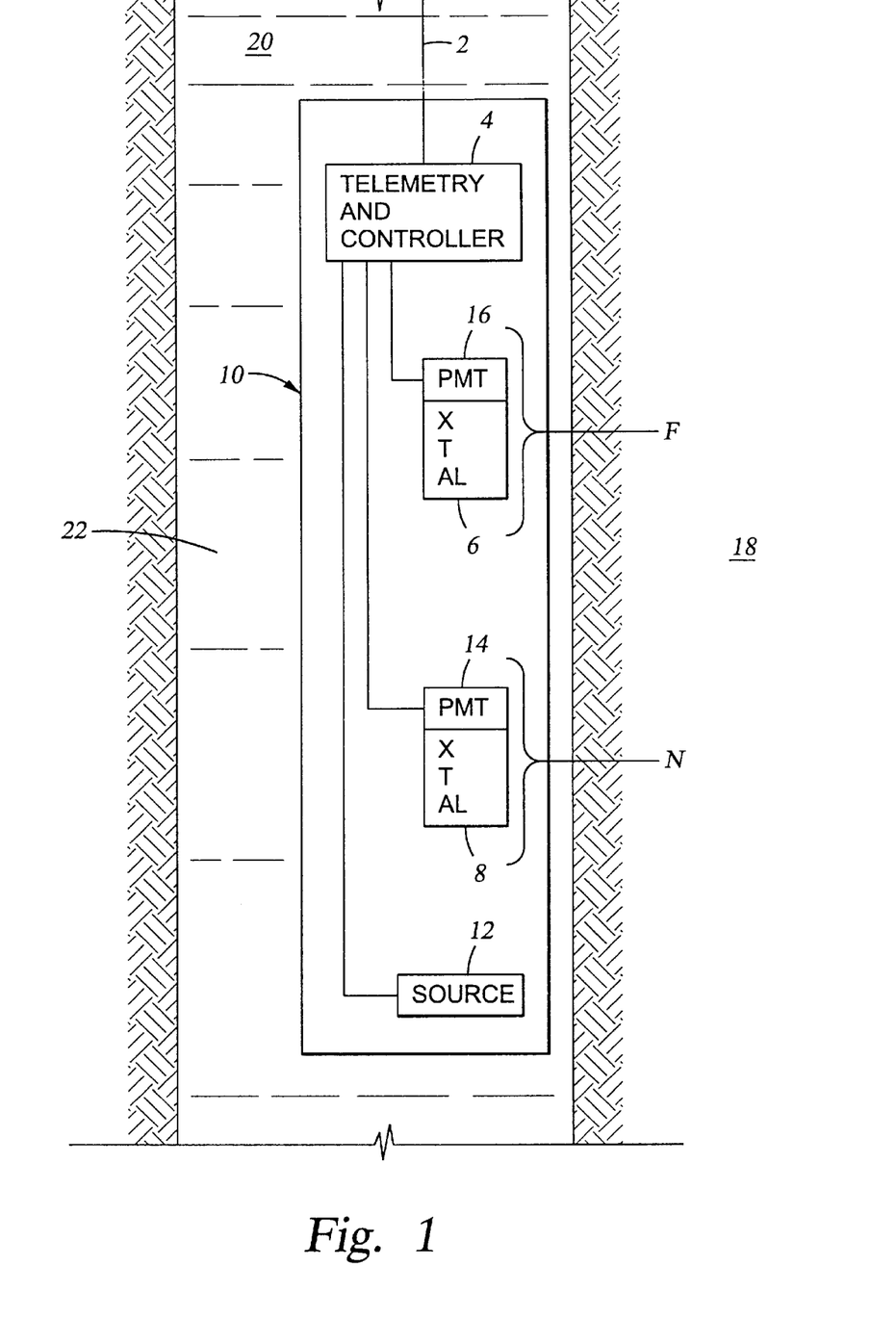
FIG. 1 shows the layout of a carbon-oxygen well logging instrument used in the method of the invention.

FIG. 1 shows a carbon-oxygen well logging instrument for making measurements used in the method of this invention. The instrument 10 includes a controllable source 12 of high energy neutrons. The source 12 can be selected from types known in the art which emit controlled-duration bursts of high energy neutrons. See for example, U.S. Pat. No. 4,996,017 issued to Ethridge. Timing of the bursts can be controlled by a telemetry/controller module 4 which can include circuitry well known in the art for controlling the burst timing. The instrument 10 includes a near detector N which preferably consists of a sodium iodide or similar scintillator crystal 8 optically coupled to a photomultiplier tube 14. A far detector F can include a similar scintillator crystal 6 and a photomultiplier 16. Test results for this invention, which will be described further herein, were performed with the scintillator crystal 8 being about 1 inch diameter, 4 inches long, and spaced at its nearest end about 13 inches form the nearest end of the source 12. Also for purposes of testing the method of the invention, crystal 6 can have a diameter of about 1 inch, be about 6 inches long, and be spaced at its nearest end about 22 inches form the nearest end of the source 12. It is to be understood that other spacings between the source 12 and the detectors N, F can be used in the method of this invention. The invention, moreover, is not intended to be limited to instruments having only two spaced apart detectors N, F. Instruments having more than two axially spaced detectors can be used in the invention as well. A two detector instrument was used in testing the method of the invention to make the description more easily understandable. It is also to be understood that other sizes, and other known compositions of scintillator crystal such as bismuth germanate and lutetium oxyorthosilicate, may also be used in a carbon-oxygen logging instrument for making measurements as used in this invention.

The electrical output of each photomultiplier 14, 16 can be conducted to the telemetry/controller module 4. The telemetry/controller module 4 can include well known circuitry (not shown) for measuring the amplitude of voltage pulses generated by each photomultiplier 14, 16 in response to scintillations from each crystal 6, 8 so that the energy level of each detected gamma ray can be determined. The telemetry/controller module 4 can include circuitry (not shown separately) for imparting signals to a well logging cable 2 which correspond to the numbers of gamma rays detected at each energy level determined by the amplitude determination circuits in the telemetry/controller module 4. The signals may be decoded and interpreted at the earth's surface for analysis while the instrument is disposed within a wellbore 22, but it is to be understood that the instrument 10 may also include a memory or similar recording device (not shown) to store the signals until the instrument is withdrawn from the wellbore 22.

The wellbore 22 is drilled through earth formations, shown generally at 18. The wellbore 22 is filled with a fluid, shown generally at 20, which typically consists of a mixture of oil and water. The fractional amount of the oil (referred to as holdup) in the fluid 20 can be determined from the numbers of gamma rays detected at each detector N, F. Fluid can also fill pore spaces in the earth formations 18. The fluid in the pore spaces of the earth formation can also consist of a mixture of oil and water. The fractional amount of oil in the total fluid volume in the pore spaces (referred to as the oil saturation) can also be determined from the number of gamma rays detected at particular energy levels. See for example, *A New Compensated Through Tubing Carbon/Oxygen Tool for Use in Flowing Wells*, Scott et al, SPWLA 32nd Annual Logging Symposium, Jun. 16–19, 1991. More specifically, the numbers of detected gamma rays at each energy level can be used to determine relative amounts of carbon and oxygen in the wellbore 22 and in the formation. Methods for determining the relative amounts of carbon and oxygen from the numbers of detected gamma rays are known in the art. See for example U.S. Pat. No. 5,374,823 issued to Odom.

The method of the invention can include four processing steps for the measurements of the relative amounts of carbon and oxygen from the gamma ray counts of each detector. The processing steps are based on the determination that the relative amounts of carbon and oxygen, as indicated by the gamma rays detected by the instrument 10, are not linearly related to the fractional volumes of oil and water, particularly the fractional volumes of oil and water in the wellbore 22.

First, an apparent oil holdup is determined, from the relative amounts of carbon and oxygen measured at each detector N, F, for the fluid 20 in the wellbore 22. The apparent oil holdup in the wellbore $H_o^i$ at each detector N, F can be determined according to the expression:

$$H_0^i = \left( \frac{CO^i - CO^i_{Bmin}}{\Delta CO_B^i} \right)^n \quad (1)$$

In equation (1), $CO^i$ represents the ratio of the amount of carbon with respect to the amount of oxygen, as determined at the i-th detector. For the instrument 10 as described previously herein, i can be equal to 1 or 2 since there are two detectors, but as previously explained the invention can use instruments having more than two detectors. The quantity $CO^i_{B\ min}$ represents the expected CO ratio value at the i-th detector when the fluid 20 in the wellbore 22 consists entirely of water ($H_o=0$), and when the fluid in the pore spaces of the formation 18 also consists entirely of water. $\Delta CO_B$ represents the expected difference between the CO ratio values which would obtain at the i-th detector when the fluid in the wellbore 22 consists entirely of oil ($H_o=1$), and when the fluid in the wellbore 22 consists entirely of water. It should be noted that both of the CO ratio measurements used in calculating the expected difference $\Delta CO^i$ can be determined under the condition that the fluid in the pore spaces of the formation 18 consists entirely of water. The reason that this assumption may be used is that the range of CO ratio values is affected to a much greater degree by the oil holdup in the wellbore 22 than it is by the oil saturation in the formation 18. $CO^i_{B\ min}$ and $\Delta CO_B$ are, however, substantially dependent on the fractional volume of pore space (referred to as porosity) in the formation 18, the mineral composition of the formation 18, and the diameter of the wellbore 22. The porosity of the earth formation 18 can be determined from core samples or from any one of a number of well known well logging measurements. Values for $CO^i_{B\ min}$ and $\Delta CO_B$ can be determined, for various mineral compositions and for a wide range of wellbore diameters and porosity values, by laboratory experiment or by simulation methods known in the art such as Monte Carlo modeling. The exponent n in equation (1) can be determined, in laboratory experiments or by simulation, by fitting a number of known values of oil holdup to the values of oil holdup determined from equation (1) over the entire range of oil holdup values from zero to one. The relationship defined by equation (1) will be unique for each detector N, F in the instrument 10. The term "configuration" includes items such as the type of neutron source, and the size, chemical composition and spacing from the source of the detector crystals.

Next, a corrected value of the oil holdup in the wellbore can be determined from the apparent holdup at each detector N, F according to a holdup model. The holdup model can be mathematically expressed as:

$$H_0 = \sum_{i=1}^{N} A_i H_0^i + \sum_{i=1}^{N}\sum_{j=2}^{N} B_{ij}\Delta H_0^{ij} + \sum_{i=1}^{N}\sum_{j=2}^{N} C_{ij}(\Delta H_0^{ij})^3 \quad (2)$$

In equation (2) $\Delta H_o^{ij}$ represents the difference in the apparent wellbore oil holdup measurements between the i-th and the j-th detectors, and N represents the total number of detectors. The A, B and C coefficients can be determined by minimizing the differences between the true value of the oil holdup $H_o$ and the modeled value calculated by equation (2) for a series of laboratory experiments (or a series of computer simulations) using a wide range of oil holdup values. The differences can be minimized using least squares fitting methods known in the art. The relationship defined in equation (2) will be unique for each configuration of source 12 and detectors N, F in the instrument 10.

Next, at each detector N, F an apparent oil saturation in the pore space of the formation 18 can be determined from the CO ratio measurements made at each detector N, F. The apparent oil saturation values are determined with respect to the calculated value of wellbore oil holdup as previously determined by equation (2). The apparent formation oil saturation at the i-th detector for the calculated value of wellbore oil holdup $S_o^i(H_o)$ can be determined according to the expression:

$$S_0^i(H_0) = \frac{CO^i - CO^i_{Fmin}(H_0)}{\Delta CO_F^i(H_0)} \quad (3)$$

In equation (3), $CO^i$ represents the CO ratio measurement at the i-th detector, $CO^i_{F\ min}(H_o)$ represents the expected CO ratio measurement at the i-th detector when the oil saturation in the formation 18 is equal to zero ($S_o=0$) and the wellbore 22 oil holdup is equal to $H_o$. $\Delta CO^i_F(H_o)$ represents the expected difference, at the i-th detector, between CO ratio measurements made when the fluid in the pore space consists entirely of oil and when it consists entirely of water, and the oil holdup in the wellbore 22 is equal to $H_o$. $CO^i_{F\ min}(H_o)$ and $\Delta CO^i_F(H_o)$ will be affected by, among other things, the diameter of the wellbore 22, the mineral composition of the earth formation, and by the value of porosity. Most importantly, the values of $CO^i_{F\ min}(H_o)$ and $\Delta CO^i_F(H_o)$ will be affected by the value of the oil holdup in the wellbore 22. $CO^i_{F\ min}(H_o)$ and $\Delta CO^i_{F\ min}(H_o)$ can be determined, for any particular mineral composition, value of porosity and wellbore diameter, by laboratory experiment or by numerical simulation methods such as Monte Carlo modeling for various values of oil holdup in the wellbore 22.

The apparent oil saturation value determined in equation (3) for each detector N, F can be used to calculate a corrected oil saturation value according to the expression:

$$S_0 = \sum_{i=1}^{N} D_i S_0^i + \sum_{i=1}^{N}\sum_{j=2}^{N} E_{ij}\Delta S_0^{ij} + \sum_{i=1}^{N}\sum_{j=2}^{N} F_{ij}(\Delta S_0^{ij})^3 \quad (4)$$

where $\Delta S_o^{ij}$ represents the difference between apparent oil saturation values for the i-th and j-th detectors, and as in equation (2), N represents the total number of detectors. Coefficients D, E and F can be determined by minimizing the difference between the oil saturation calculated using equation (4) and the actual oil saturation used in a laboratory model or simulation, for a range of known oil saturation and porosity values, as well as for a range of known wellbore oil holdup values. The differences can be minimized using least squares techniques known in the art. Coefficients D, E and F will be unique for each configuration of source and detectors used in the instrument 10. Coefficients D, E and F will also be unique for each value of oil holdup in the wellbore 22. Coefficient sets can be determined for the particular instrument over the entire range of oil holdup values. The coefficient sets can be stored in lookup tables. The coefficient set actually used in making a particular saturation calculation can be selected from the lookup table based on which is the closest wellbore oil holdup represented in the coefficient tables to the holdup calculated in equation (2).

Alternatively, it is possible to calculate a corrected oil saturation for each individual detector N, F. The CO measurement at the particular detector is scaled into the apparent saturation value by equation (3). The apparent saturation is interpolated between the two values of oil holdup, determined in laboratory experiment or simulation, being closest to the corrected wellbore oil holdup determined by equation (2). If this alternative method of calculating the corrected oil saturation is used, it should be noted that there exists a tradeoff between statistical accuracy of the measurements and the sensitivity of the measurement to the oil saturation in the formation 18. Using the CO measurement from a more closely spaced detector such as near detector N will give a result having fewer statistical variations. Selecting a more distant detector such as far detector F will improve the sensitivity of the result to the oil saturation in the formation, but will suffer more statistical variation.

SIMULATION RESULTS

The method of the invention was tested by numerical simulation. First, empirical relationships between the CO ratio and the wellbore oil holdup were generated for various values of oil holdup at each detector N, F on the instrument 10. Table 1 shows the various parameters used to generate the empirical relationship for the expression in equation (1):

TABLE 1

| Parameter | Values Used in Simulation |
| --- | --- |
| Formation Porosity | 0, 10, 20, 30, 40 percent |
| Formation Oil Saturation | 0, 100 percent |
| Mineral Composition | Limestone |
| Wellbore Diameter | 6.0 and 8.5 inches |
| Wellbore Oil Holdup | 0, 25, 50, 75, 100 percent |

Next, models of the CO response of an instrument was simulated so that the empirical relationships shown in equations (2) and (4) could be developed for the instrument 10 as shown in FIG. 1 and previously described herein. After determining the coefficients for the empirical relationships in equations (2) and (4), the effectiveness of the method was tested for a random set of values of oil saturation and oil holdup for two typical values of formation porosity. The parameters used are shown in Table 2:

TABLE 2

| Test # | Formation Porosity (percent) | Formation Oil Saturation (percent) | Wellbore Oil Holdup (percent) |
| --- | --- | --- | --- |
| 1 | 20 | 75 | 80 |
| 2 | 20 | 10 | 75 |
| 3 | 20 | 0 | 75 |
| 4 | 25 | 80 | 60 |
| 5 | 25 | 0 | 50 |
| 6 | 25 | 50 | 40 |
| 7 | 25 | 40 | 30 |
| 8 | 20 | 50 | 20 |

The parameters shown in Table 2 were used to simulate the CO response of each detector on an instrument configured as shown in FIG. 1. The simulated CO response of each detector was then processed by the method described herein. The oil saturation and oil holdup values calculated using the method of this invention were then compared with the saturation and holdup values shown in Table 2. Differences between the parameters in Table 2 and the calculations using the method of the invention are shown graphically in FIGS. 2–9.

Figure 2:
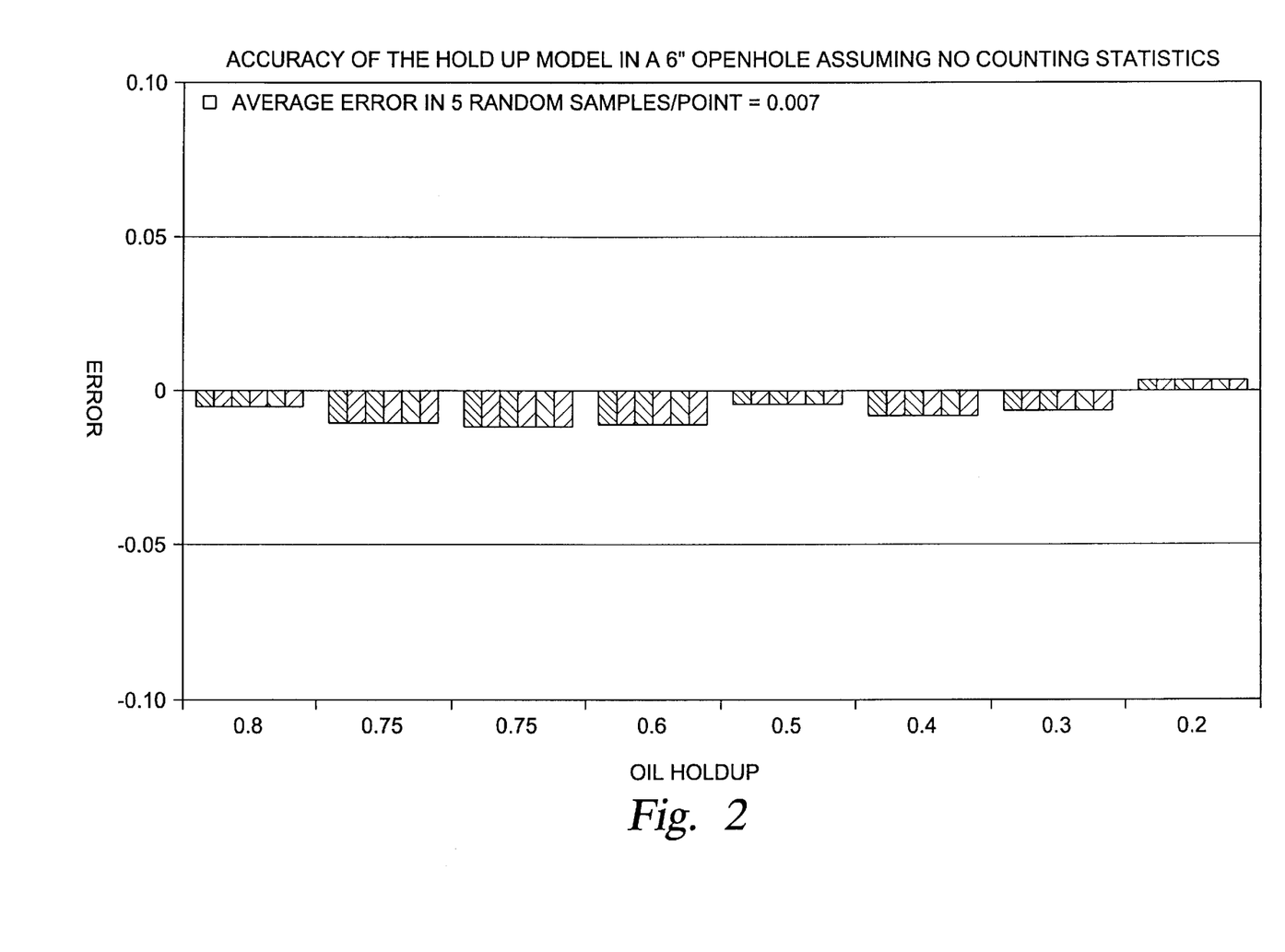
FIG. 2 shows a graph comparing the wellbore oil holdup calculated using the invention with known values of oil holdup.

FIG. 2 shows the difference between the wellbore oil holdup calculated by the method of the invention and each of the holdup values shown in Table 2. The wellbore diameter for the simulation shown in FIG. 2 is 6 inches. Each value of oil holdup includes five separate graphic indications of difference, or "error". The test results for each of the simulations described herein were performed five different times to test the statistical accuracy of the method as well as its overall accuracy. In FIG. 2, all five graphic indicators for each oil holdup value are the same because the simulation shown in FIG. 2 did not include statistics in the simulated gamma ray counting rates.

Figure 3:
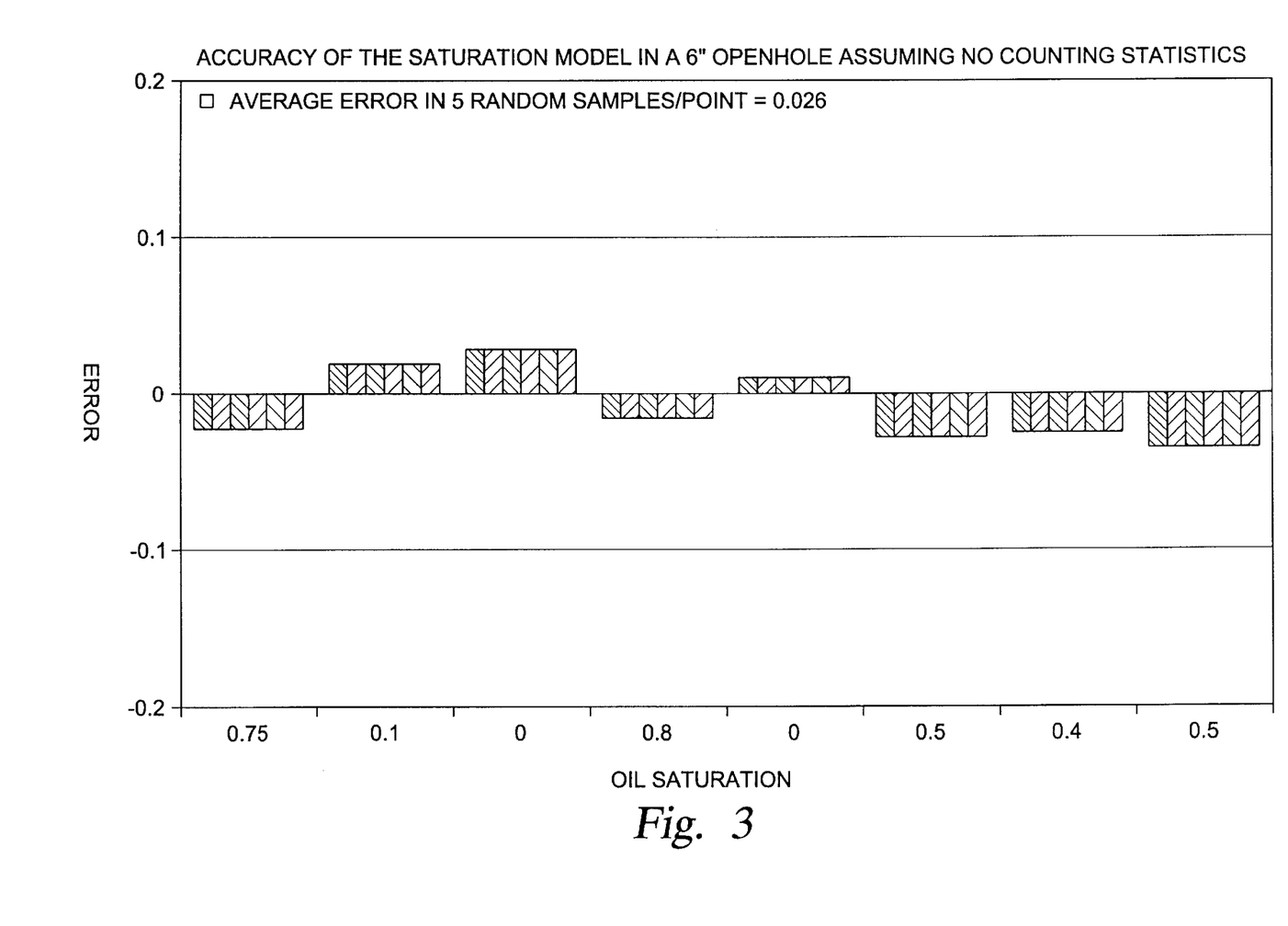
FIG. 3 shows a graph comparing the formation oil saturation calculated using the invention with known values of oil saturation.

FIG. 3 shows the results of the formation oil saturation calculated according to the method of the invention under the same test conditions as those for the simulation shown in FIG. 2.

Figure 4:
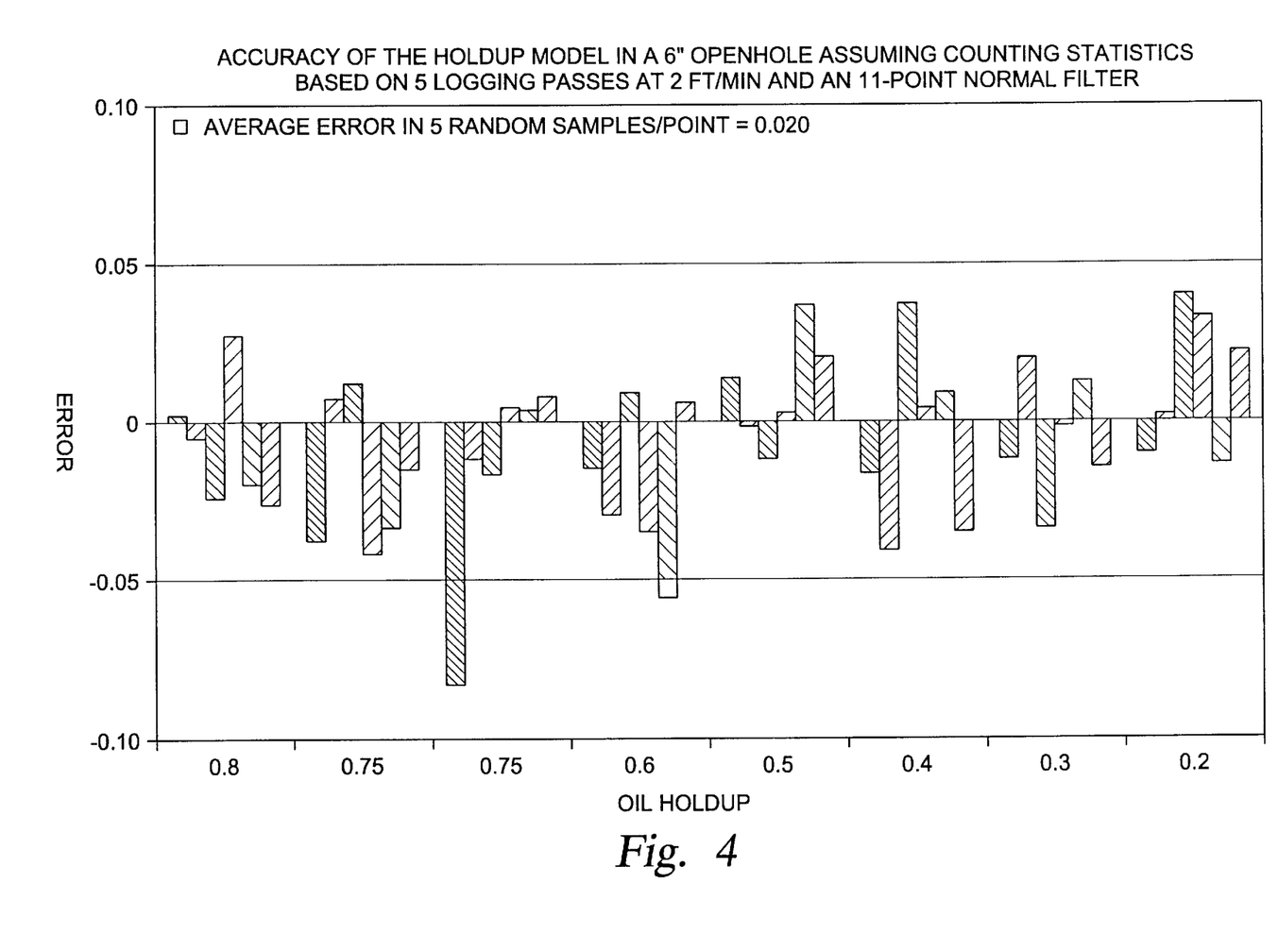
FIG. 4 a graph comparing the wellbore oil holdup calculated using the invention with known values of oil holdup as in FIG. 2 with the addition of counting statistics to the results.

FIG. 4 shows oil holdup calculation results using the method of the invention as in FIG. 2, but with the addition of statistics equivalent to moving the instrument (10 in FIG. 1) through the wellbore (22 in FIG. 1) at a rate of 2 feet per minute. As is known in the art this is a typical speed for carbon/oxygen logging.

Figure 5:
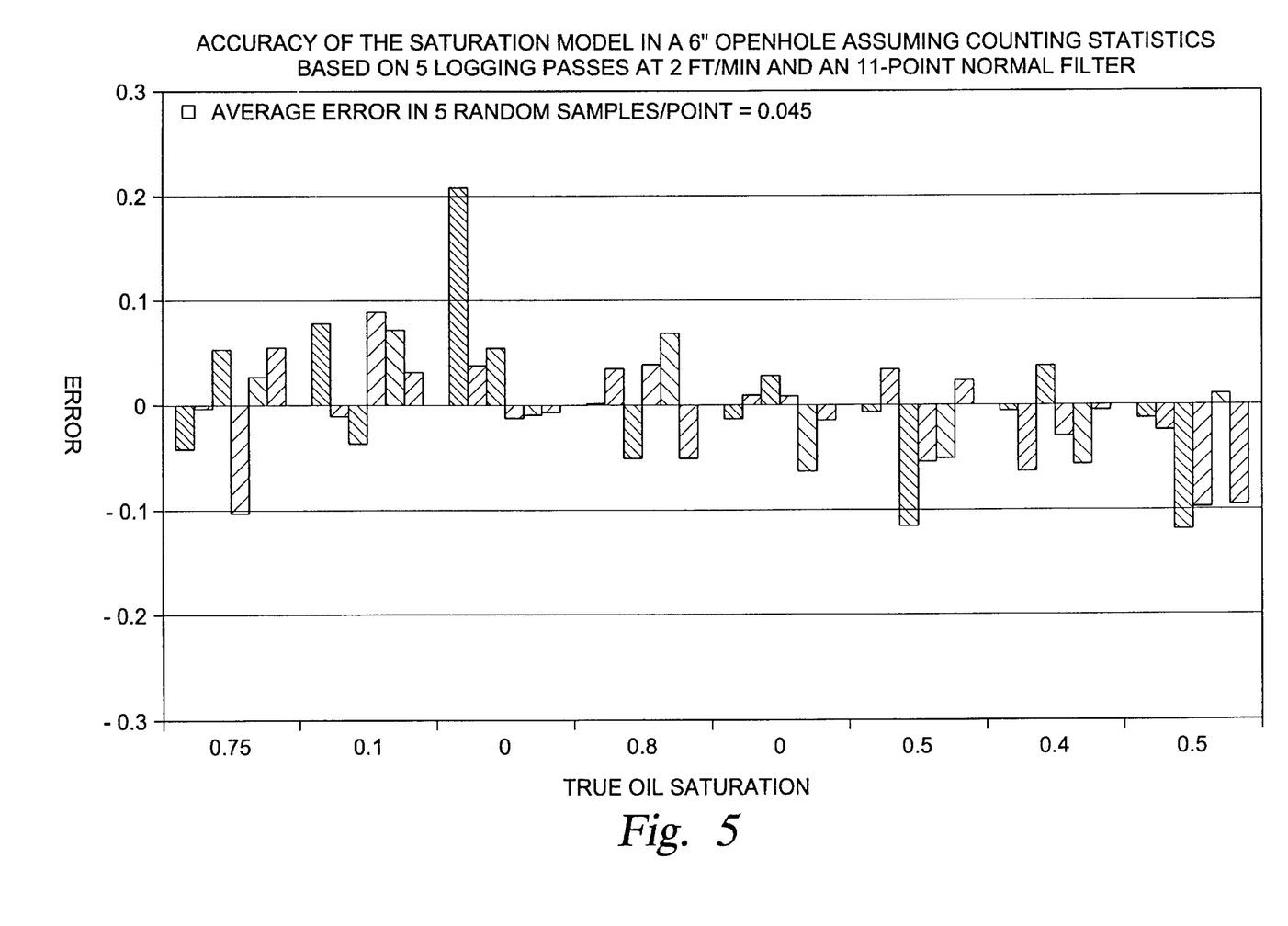
FIG. 5 shows a graph comparing the formation oil saturation calculated using the invention with known values of oil saturation as in FIG. 3 with the addition of counting statistics.
Figure 6:
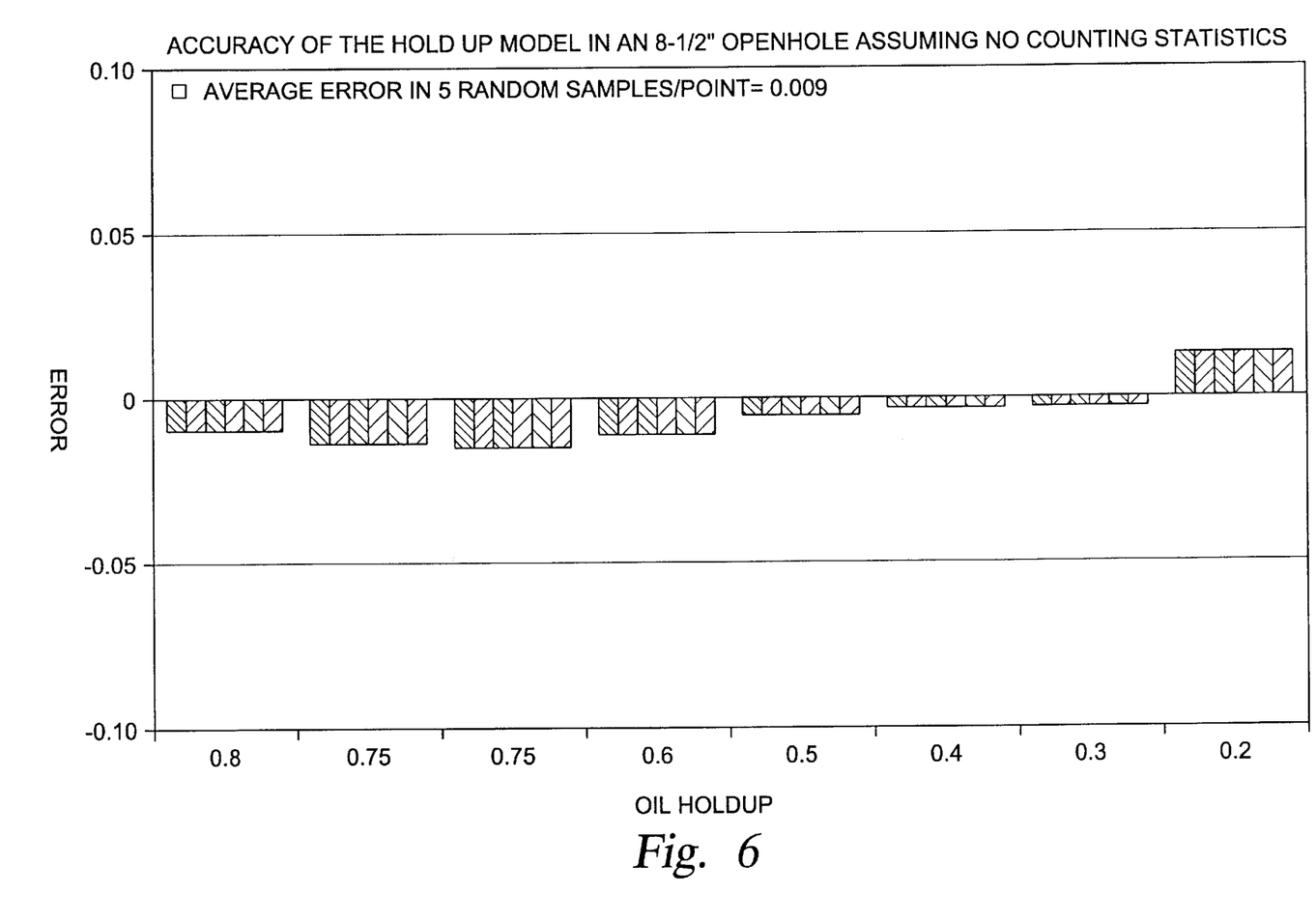
FIGS. 6 through 9 show results similar to those shown in FIGS. 2 through 5, respectively, but for an 8.5 inch diameter wellbore instead of a 6 inch wellbore as for FIGS. 2 through 5.
Figure 7:
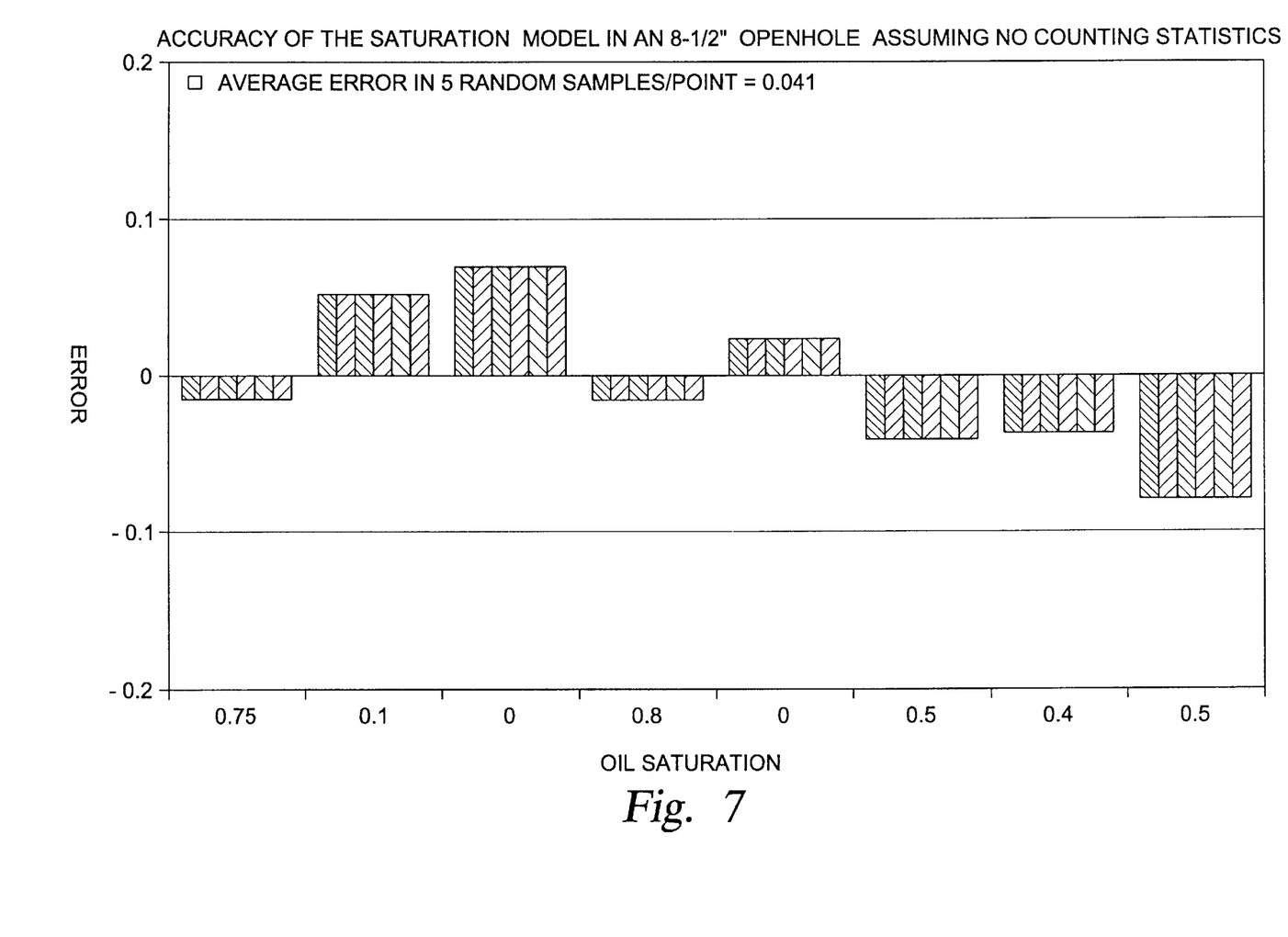
Figure 8:
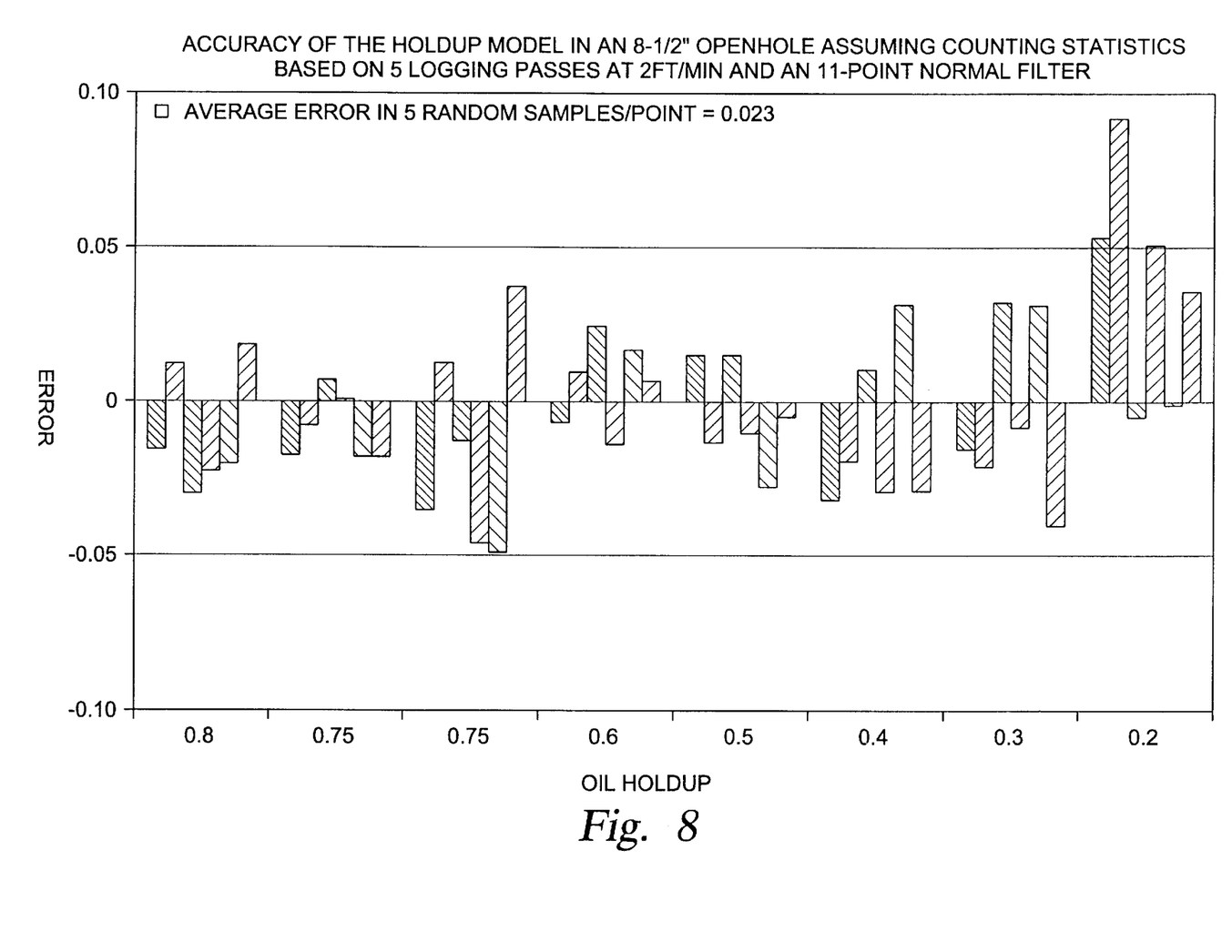
Figure 9:
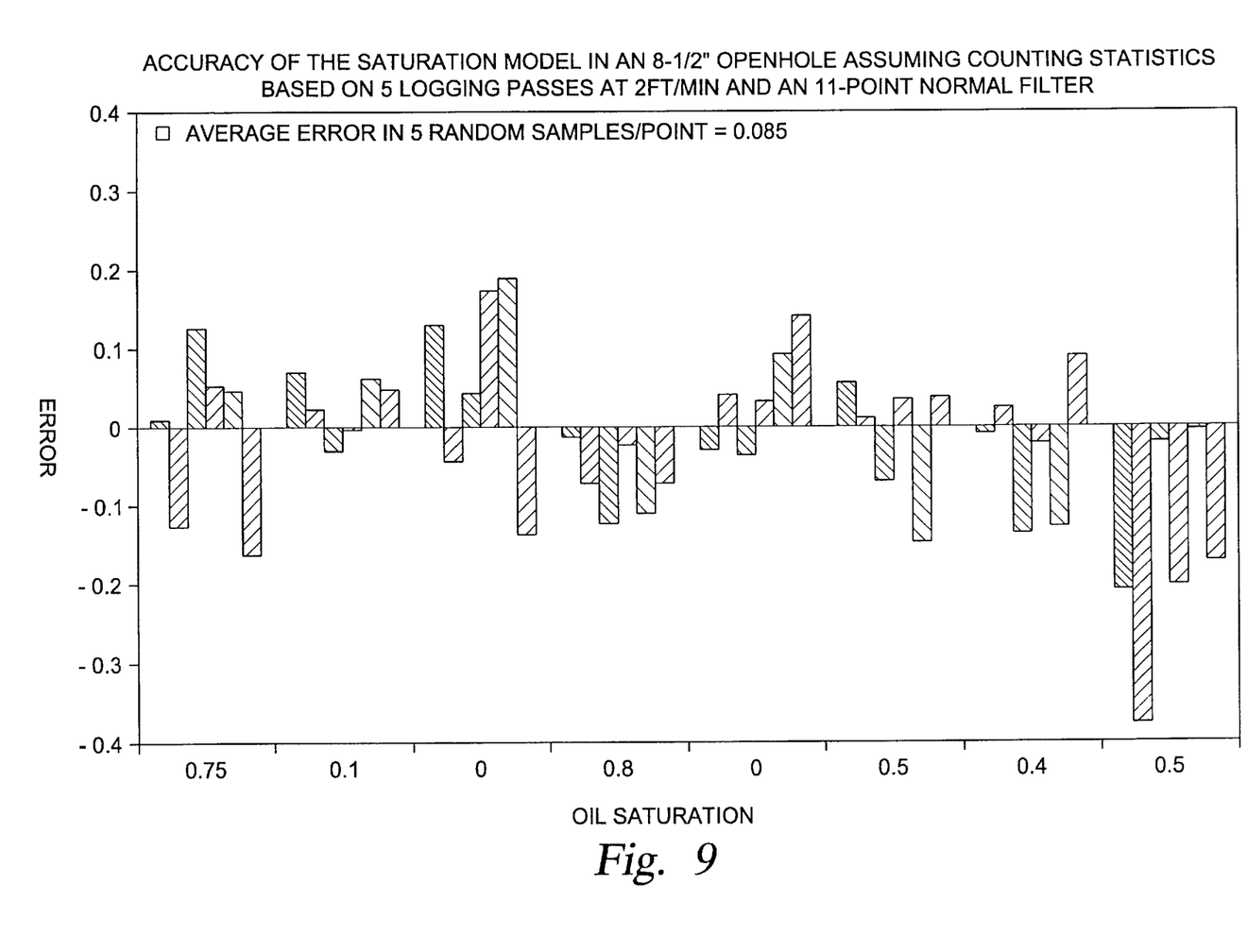

FIG. 5 shows formation oil saturation calculations as in FIG. 3, but with the addition of statistics equivalent to moving the instrument through the wellbore at 2 feet per minute, as for the results shown in FIG. 4.

FIGS. 6 through 9 show test results for the method of the invention similar to the results shown in FIG. 2 through 5, respectively, the difference being that all the simulations for the results shown in FIGS. 5 through 9 were for a wellbore diameter of 8.5 inches.

The invention provides an improved method of determining wellbore oil holdup and formation oil saturation without the need to have prior knowledge of the oil holdup in the wellbore.

Those skilled in the art will devise other embodiments of this invention which do not depart from the spirit of the invention as described herein. The invention should therefore be limited in scope only by the attached claims.

What is claimed is:

1. A method for determining oil saturation in an earth formation penetrated by a wellbore, comprising:

irradiating said earth formation with bursts of high energy neutrons;

detecting inelastic gamma rays emitted from said formation, at spaced apart locations from a source of said neutrons;

determining relative amounts of carbon and oxygen at each of said spaced apart locations from energy spectra of said inelastic gamma rays;

calculating an apparent oil holdup in said wellbore at each of said spaced apart locations from said relative amounts of carbon and oxygen;

calculating a corrected oil holdup in said wellbore from differences between said apparent holdups at each of said spaced apart locations;

calculating an apparent oil saturation in said formation at each of said spaced apart locations from said relative amounts of carbon and oxygen and from said corrected holdup; and calculating a corrected oil saturation in said formation from differences between said apparent saturations at each of said spaced apart locations.

2. The method as defined in claim 1 wherein said apparent oil holdup is calculated from an empirical relationship of said relative amounts of carbon and oxygen with respect to a true oil holdup, said empirical relationship determined with respect to preselected mineral compositions of said earth formation, preselected fractional volumes of pore space in said earth formation and preselected diameters of said wellbore.

3. The method as defined in claim 2 wherein said empirical relationship is determined from laboratory experiments.

4. The method as defined in claim 2 wherein said empirical relationship is determined from numerical simulation.

5. The method as defined in claim 1 wherein said corrected oil holdup is calculated by minimizing differences between said apparent oil holdup and a true oil holdup over a range of values of said true oil holdup.

6. The method as defined in claim 5 wherein said differences between said apparent holdup and said true oil holdup are determined from laboratory experiments.

7. The method as defined in claim 5 wherein said differences between said apparent holdup and said true oil holdup are determined from numerical simulation.

8. The method as defined in claim 1 wherein said apparent oil saturation is calculated from an empirical relationship of said relative amounts of carbon and oxygen with respect to a true oil saturation, said empirical relationship determined with respect to preselected mineral compositions of said earth formation, preselected fractional volumes of pore space in said earth formation, and said corrected oil holdup.

9. The method as defined in claim 8 wherein said empirical relationship is determined from laboratory experiments.

10. The method as defined in claim 8 wherein said empirical relationship is determined from numerical simulation.

11. The method as defined in claim 8 wherein said corrected oil saturation is calculated by minimizing differences between said corrected oil saturation and a true oil saturation over a range of values of said true oil saturation at said corrected oil holdup.

12. The method as defined in claim 11 wherein said differences between said corrected oil saturation and said true oil saturation are determined from numerical simulation.

13. The method as defined in claim 11 wherein said differences between said corrected oil saturation and said true oil saturation are determined from laboratory experiments.

14. A method for determining oil saturation in an earth formation from measurements of relative amounts of carbon and oxygen in said formation made by spectral analysis of neutron-induced inelastic gamma rays detected from said earth formation at spaced apart locations, comprising:

calculating an apparent oil holdup in said wellbore at each of said spaced apart locations from said relative amounts of carbon and oxygen;

calculating a corrected oil holdup in said wellbore from differences between said apparent holdups at each of said spaced apart locations;

calculating an apparent oil saturation in said formation at each of said spaced apart locations from said relative amounts of carbon and oxygen and said corrected holdup;

calculating a corrected oil saturation in said formation from differences between said apparent saturations at each of said spaced apart locations.

15. The method as defined in claim 14 wherein said apparent oil holdup is calculated from an empirical relationship of said relative amounts of carbon and oxygen with respect to a true oil holdup, said empirical relationship determined with respect to preselected mineral compositions of said earth formation, preselected fractional volumes of pore space in said earth formation and preselected diameters of said wellbore.

16. The method as defined in claim 15 wherein said empirical relationship is determined from laboratory experiments.

17. The method as defined in claim 15 wherein said empirical relationship is determined from numerical simulation.

18. The method as defined in claim 14 wherein said corrected oil holdup is calculated by minimizing differences between said apparent oil holdup and a true oil holdup over a range of values of said true oil holdup.

19. The method as defined in claim 18 wherein said differences between said apparent holdup and said true oil holdup are determined from laboratory experiments.

20. The method as defined in claim 18 wherein said differences between said apparent holdup and said true oil holdup are determined from numerical simulation.

21. The method as defined in claim 14 wherein said apparent oil saturation is calculated from an empirical relationship of said relative amounts of carbon and oxygen with respect to a true oil saturation, said empirical relationship determined with respect to preselected mineral compositions of said earth formation, preselected fractional volumes of pore space in said earth formation, and said corrected oil holdup.

22. The method as defined in claim 21 wherein said empirical relationship is determined from laboratory experiments.

23. The method as defined in claim 21 wherein said empirical relationship is determined from numerical simulation.

24. The method as defined in claim 21 wherein said corrected oil saturation is calculated by minimizing differences between said corrected oil saturation and a true oil saturation over a range of values of said true oil saturation at said corrected oil holdup.

25. The method as defined in claim 24 wherein said differences between said corrected oil saturation and said true oil saturation are determined from numerical simulation.

26. The method as defined in claim 24 wherein said differences between said corrected oil saturation and said true oil saturation are determined from laboratory experiments.

27. A method for determining oil saturation in an earth formation from measurements of relative amounts of carbon and oxygen in said formation made by spectral analysis of neutron-induced inelastic gamma rays detected from said earth formation at spaced apart locations, comprising:

calculating an apparent oil holdup in said wellbore at each of said spaced apart locations from said relative amounts of carbon and oxygen;

calculating a corrected oil holdup in said wellbore from differences between said apparent holdups at each of said spaced apart locations;

calculating an apparent oil saturation in said formation at one of said spaced apart locations from said relative amounts of carbon and oxygen and said corrected holdup;

calculating a corrected oil saturation by interpolating said apparent saturation between selected values of said holdup closest to said corrected holdup for which an empirical value of said saturation is determined from said relative amounts of carbon and oxygen.

28. The method as defined in claim 27 wherein said empirical values are determined from laboratory experiments.

29. The method as defined in claim 27 wherein said empirical values is determined from numerical simulation.

30. The method as defined in claim 27 wherein said corrected holdup is determined by minimizing differences between said apparent holdup and a true oil holdup over a range of values of said true oil holdup.

31. The method as defined in claim 30 wherein said differences between said apparent holdup and said true oil holdup are determined from laboratory experiments.

32. The method as defined in claim 30 wherein said differences between said apparent holdup and said true oil holdup are determined from numerical simulation.

* * * * *